United States Patent
Raja

(10) Patent No.: US 10,121,131 B2
(45) Date of Patent: Nov. 6, 2018

(54) CHANGE ON CARD METHOD AND APPARATUS

(71) Applicant: MASTERCARD INTERNATIONAL INCORPORATED, Purchase, NY (US)

(72) Inventor: Stephen Suganth Raja, Saint Charles, MO (US)

(73) Assignee: Mastercard International Incorporated, Purchase, NY (US)

( * ) Notice: Subject to any disclaimer, the term of this patent is extended or adjusted under 35 U.S.C. 154(b) by 289 days.

(21) Appl. No.: 13/955,525

(22) Filed: Jul. 31, 2013

(65) Prior Publication Data
US 2015/0039492 A1 Feb. 5, 2015

(51) Int. Cl.
G06Q 20/18 (2012.01)
G07F 17/42 (2006.01)
G06Q 20/34 (2012.01)
G07F 5/24 (2006.01)

(52) U.S. Cl.
CPC .......... *G06Q 20/18* (2013.01); *G06Q 20/349* (2013.01); *G07F 5/24* (2013.01); *G07F 17/42* (2013.01)

(58) Field of Classification Search
USPC ........... 705/30, 39, 45, 40, 17, 35; 235/375, 235/380, 475; 209/583; 271/302
See application file for complete search history.

(56) References Cited

U.S. PATENT DOCUMENTS

| | | | | |
|---|---|---|---|---|
| 3,818,828 A * | 6/1974 | Nakada et al. | | 101/269 |
| 4,745,265 A * | 5/1988 | Douno | | G06K 17/00 235/379 |
| 5,301,834 A * | 4/1994 | Lee | | B65H 3/523 221/129 |
| 5,889,941 A * | 3/1999 | Tushie | | G06Q 20/367 235/380 |
| 6,105,861 A * | 8/2000 | Kuit | | B42D 25/00 209/583 |
| 6,345,760 B1 * | 2/2002 | Eason | | B65H 1/06 235/380 |
| 6,446,832 B1 * | 9/2002 | Holec | | G06K 13/14 221/7 |
| 6,980,969 B1 * | 12/2005 | Tuchler et al. | | 705/39 |
| 7,509,285 B1 * | 3/2009 | Maniar | | G06Q 20/3674 705/35 |
| 7,731,084 B2 * | 6/2010 | Redick | | G06Q 20/10 235/379 |
| 8,157,164 B1 * | 4/2012 | Billman | | G07F 17/42 235/375 |
| 8,595,074 B2 * | 11/2013 | Sharma et al. | | 705/21 |
| 2002/0103707 A1 * | 8/2002 | Takeuchi | | G06Q 20/0457 705/16 |
| 2005/0275894 A1 * | 12/2005 | Minowa | | G07F 17/42 358/1.18 |
| 2007/0156579 A1 * | 7/2007 | Manesh | | G06Q 20/10 705/39 |
| 2007/0199986 A1 * | 8/2007 | Walsh | | G06Q 20/18 235/380 |
| 2010/0082485 A1 * | 4/2010 | Lin et al. | | 705/44 |
| 2014/0258109 A1 * | 9/2014 | Jiang | | G06O 20/341 705/41 |

* cited by examiner

*Primary Examiner* — Tien C Nguyen
(74) *Attorney, Agent, or Firm* — Hovey Williams LLP

(57) ABSTRACT

A system, method, and computer-readable storage medium configured to enable intelligent management and implementation of travel policies, elite cardholder benefits, or vendor offers related to expenses incurred on a payment card.

18 Claims, 3 Drawing Sheets

CHANGE ON CARD METHOD AND APPARATUS

BACKGROUND

Field of the Disclosure

Aspects of the disclosure relate in general to financial services. Aspects include an apparatus, system, method and computer-readable storage medium to return change from a cash purchase to a payment card.

Description of the Related Art

For centuries, financial transactions have used currency, such as banknotes and coins ("cash"). Because cash transaction amounts vary, few customers are able to provide the exact transaction amount in currency. Usually, a customer gives a merchant an amount of currency in excess of the purchase amount; and the merchant returns the excess amount paid as change.

There are many problems with using cash. The tracking and counting of cash is a time-consuming process. By its very nature, currency is bulky, and exposes its users to potential theft. The secure storage of cash is problematic, and both merchants and financial institutions often require armed guard when large amounts of cash are transferred.

In modern times, however, payment cards are rapidly replacing cash to facilitate payments. A payment card is a card that can be used by a cardholder and accepted by a vendor or merchant to make a payment for a purchase or in payment of some other obligation. An example of a payment card includes a stored-value card (such as a transit card or gift card), credit card, debit card, automatic teller machine (ATM) card, or charge card. The payment card is generally used to pay an exact amount. In the case where the payment card is a debit card, some merchants will allow cardholders to obtain cash back.

Payment cards are affiliated with payment networks, which are operational networks that enable monetary exchange between parties.

SUMMARY

Embodiments include a system, device, method and computer-readable medium configured to return change from a cash purchase to a payment card.

A point-of-sale kiosk receives a cash payment for a transaction that exceeds a purchase price of the transaction. A network interface electronically deposits at least a portion of an amount exceeding the purchase price into an account associated with a payment card.

A point of sale apparatus comprises a cash/coin processing engine and a network interface. The cash/coin processing engine is configured to receive a cash payment for a transaction that exceeds a purchase price of the transaction. The network interface is configured to electronically deposit at least a portion of an amount exceeding the purchase price into an account associated with a payment card.

A non-transitory computer readable medium is encoded with data and instructions. When executed by a computing device, the instructions causing the computing device to receive, at a kiosk, a cash payment for a transaction that exceeds a purchase price of the transaction. Via a network interface, at least a portion of an amount exceeding the purchase price is electronically deposited into an account associated with a payment card.

DETAILED DESCRIPTION

One aspect of the disclosure includes the realization that change from cash purchases may be refunded to customers via a deposit on to a payment card.

Another aspect of the disclosure is the realization that refunding change from cash purchases to payment cards offers customers greater flexibility in cross-border transactions, and can help limit the losses from theft.

As described herein, a payment card includes a stored-value card (such as a transit card or gift card), credit card, debit card, automatic teller machine (ATM) card, and charge card. It is further understood that payment cards, as described herein, may also include an electronic wallet, Radio Frequency Identifier (RFID) device, cloud-based payment device, mobile phone, Near Field Communication (NFC) enabled device, or any other electronic payment device known in the art.

Embodiments of the present disclosure include a system, device, method, and computer-readable storage medium configured to return change from a cash purchase to a payment card.

Figure 1:
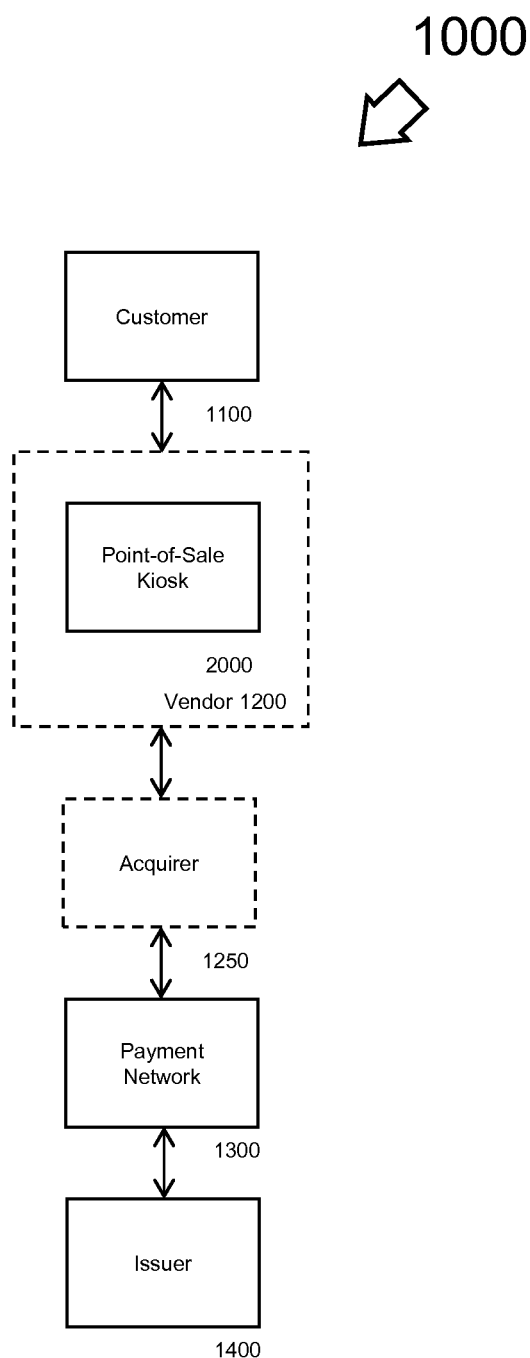
FIG. 1 illustrates an embodiment of a system configured to return change from a cash purchase to a payment card.

FIG. 1 illustrates an embodiment of a system 1000 configured to return change from a cash purchase on to a payment card, constructed and operative in accordance with an embodiment of the present disclosure.

System 1000 may include a point-of-sale (POS) kiosk 2000 located at a vendor 1200, an acquirer financial institution 1250, a payment network 1300, and an issuer financial institution 1400.

In system 1000, a customer 1100 pays for a product or service with cash at point-of-sale (POS) kiosk 2000 located at a vendor 1200. As described herein, point-of-sale kiosk 2000 may be a freestanding kiosk or sales-person-operated cash register. Point-of-Sale kiosk 2000 may return the difference between the cash paid and the purchase price as a deposit on a payment card. In doing so, kiosk 2000 may communicate with an acquirer 1250, which in turn communicates with a payment network 1300 and issuer 1400 to process the deposit.

The vendor 1200 may be any merchant or service provider that offers goods or services to a customer.

An acquirer 1250 is the bank or financial institution that processes credit and or debit card payments for products or services for a vendor 1200. In some instances, vendor 1200 may operate as its own acquirer 1250.

An issuer financial institution 1400 is the institution that that issues the payment card. In a payment card-based purchase transaction, issuer 1400 processes data (authorization requests) via a payment network 1300 and prepares the authorization-formatted response (approvals or declines). An example issuer 1400 may be a bank or credit union.

Payment network 1300 is a payment network capable of processing payments electronically. An example payment network 1300 includes MasterCard International Incorporated.

Figure 2:
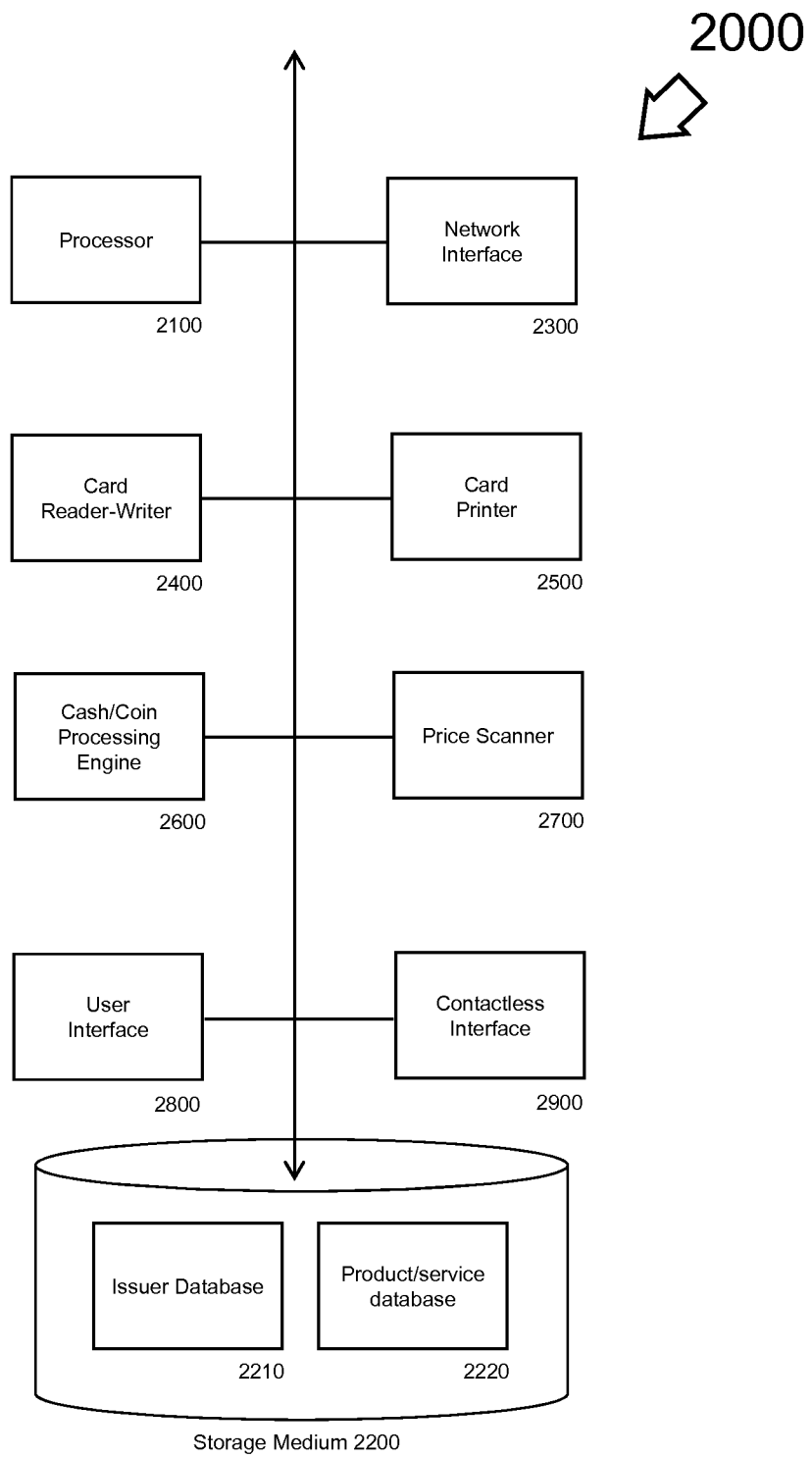
FIG. 2 depicts a block diagram of a point-of-sale device configured to return change from a cash purchase to a payment card.

Embodiments will now be disclosed with reference to a block diagram of an exemplary point-of-sale kiosk 2000 of FIG. 2, constructed and operative in accordance with an embodiment of the present disclosure.

Point-of-sale kiosk 2000 may run a multi-tasking operating system (OS) and include at least one processor 2100, a non-transitory computer-readable storage medium 2200, a network interface 2300, a payment card reader-writer 2400, a payment card printer 2500, cash/coin processing engine 2600, price scanner 2700 and user interface 2800. In some embodiments, point-of-sale kiosk 2000 may additionally include a contactless interface 2900.

Processor 2100 may be any central processing unit (CPU), microprocessor, micro-controller, computational device or electronic circuit known in the art.

Computer-readable storage media 2200 may be a conventional read/write memory such as a magnetic disk drive, floppy disk drive, optical drive, compact-disk read-only-memory (CD-ROM) drive, digital versatile disk (DVD) drive, high definition digital versatile disk (HD-DVD) drive, Blu-ray disc drive, magneto-optical drive, optical drive, flash memory, memory stick, transistor-based memory, magnetic tape or other computer-readable memory device as is known in the art for storing and retrieving data. Significantly, computer-readable storage media 2200 may be remotely located from processor 2100, and be connected to processor 2100 via a network such as a local area network (LAN), a wide area network (WAN), or the Internet.

In addition, as shown in FIG. 2, storage media 2200 may also contain an issuer database 2210 and product/service database 2220. Issuer database 2210 is configured to store information related to payment card issuers 1300, including issuers 1300 that may issue payment cards from kiosk 2000. Product/service database 2220 is configured to store pricing data for products or services offered by vendor 1200. It is understood by those familiar with the art that one or more of these databases 2210-2220 may be combined in a myriad of combinations and computer database formats. The function of these structures may best be understood with respect to the flowcharts of FIG. 3, as described below.

Network interface 2300 may be any data port as is known in the art for interfacing, communicating or transferring data across a computer network, examples of such networks include Transmission Control Protocol/Internet Protocol (TCP/IP), Ethernet, WiFi, wireless, Fiber Distributed Data Interface (FDDI), token bus, or token ring networks. Network interface 2300 allows Point-of-sale kiosk 2000 to communicate with acquirer 1250, payment network 1300, and/or issuer bank 1400.

Payment card reader-writer 2400 is the element that reads from and writes to a magnetic strip located on the "back side" of an embossed payment card.

Payment card printer 2500 is the element that physically prints payments cards compliant with the International Organization for Standardization (ISO)/International Electrotechnical Commission (IEC) 7810 ID-1 physical card standard.

Cash/coin processing engine 2600 is the device that enables kiosk 2000 to accept cash and coin payments. Additionally, in some embodiments cash/coin processing engine 2600 is capable of returning banknotes and coins as change to customers.

Price scanner 2700 is a barcode or other scanner known in the art capable of scanning price tags or barcodes.

User interface 2800 may be a display, keypad, buttons, or any other user interface known in the art communicate with a kiosk user.

Contactless interface 2900 enables kiosk 2600 to communicate with devices using near field communication (NFC) such as payment devices using the ISO/IEC 14443 standard, including PayPass™ or MasterPass™ enabled payment cards. PayPass™ and MasterPass™ are trademarks of MasterCard International Incorporated of Purchase, N.Y.

These structures may include hardware, firmware, or software encoded on a computer readable medium, such as storage media 2200. Further details of these components are described with their relation to method embodiments below.

Figure 3:
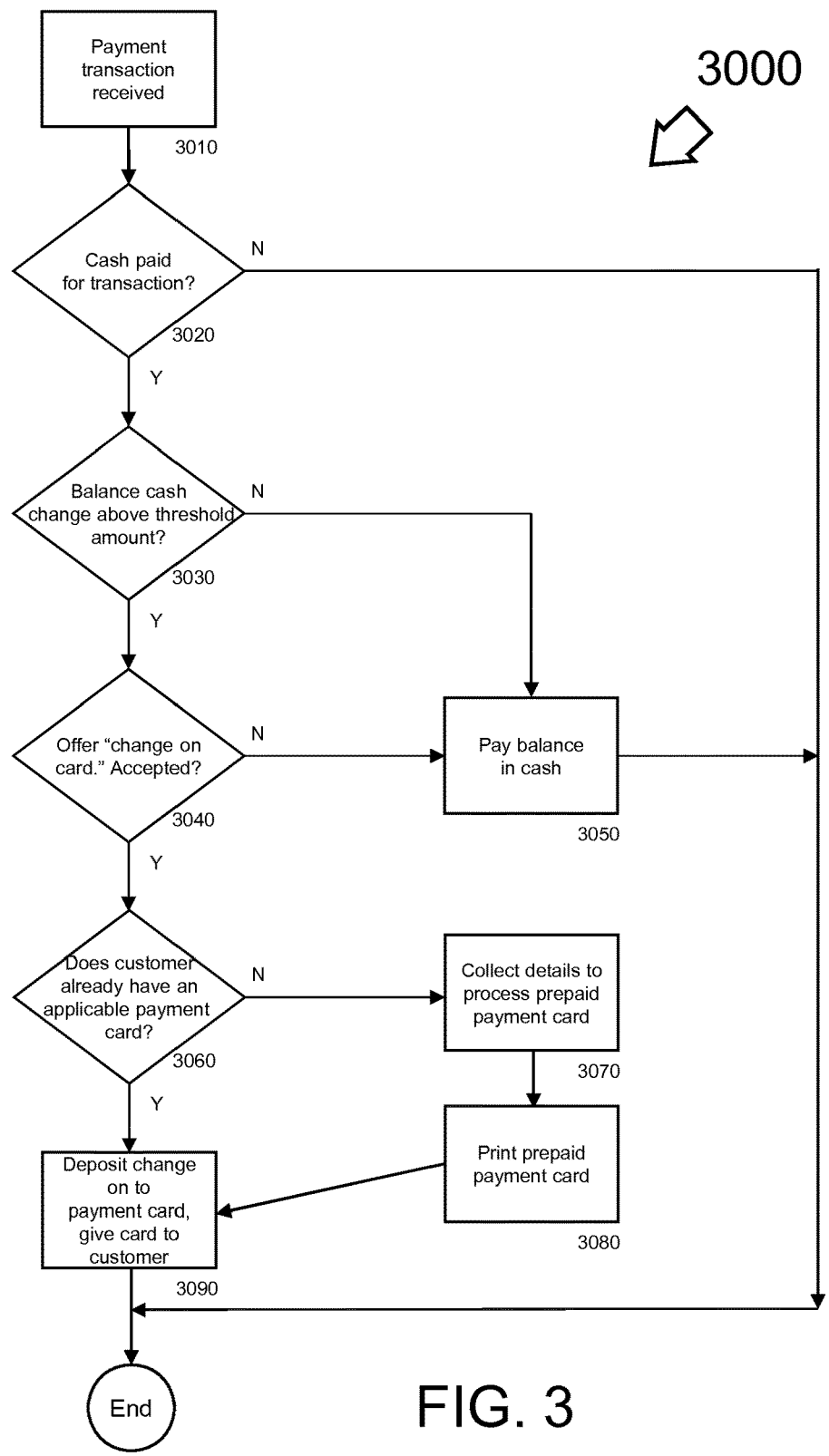
FIG. 3 flowcharts a method embodiment to return change from a cash purchase to a payment card.

We now turn our attention to method or process embodiments of the present disclosure depicted in FIG. 3. It is understood by those known in the art that instructions for such method embodiments may be stored on computer-readable memory and executed by processors. It is understood by those skilled in the art that other equivalent implementations can exist without departing from the spirit or claims of the present disclosure.

FIG. 3 flowcharts a method embodiment 3000 to return change from a cash purchase to a payment card, constructed and operative in accordance with an embodiment of the present disclosure.

Initially a payment transaction takes place with point-of-sale kiosk 2000 located at a vendor 1200, block 3010. The price of the services or products are either electronically entered via price scanner 2700 or input by a vendor customer service representative.

At decision block 3020, processor 2100 determines whether cash was used for the transaction. If cash was not used, a payment card transaction is taking place, and process 3000 ends. If cash was used, such as cash received at cash/coin processing engine 2600, the process flow continues at decision block 3030.

At decision block 3030, processor 2100 determines the amount of change should be returned to the customer (if any). If the amount of change fails to exceed a predetermined threshold amount, it may not be worthwhile to return the change on a payment card. Consequently, in some embodiments, the predetermined threshold amount is determined by the vendor 1200, acquirer 1250, payment network 1300, or issuer 1400. The predetermined threshold amount may vary from implementation to implementation. A $20 threshold may be used, for example. If the change is below the predetermined threshold amount, the change is returned in cash at block 3050. If the predetermined amount is exceeded, the process continues at block 3040.

At decision block 3040, kiosk prompts customer on whether the customer would like their change returned on a payment card. The prompting may occur via user interface 2800. If not, the change is returned in cash at block 3050.

If the customer would like their change returned on a payment card, the process continues at block 3060.

At decision block 3060, kiosk prompts customer on whether the customer has a payment card that can accept the change. If the customer has such a payment card, the process continues at block 3090.

If the customer does not have a payment card, the process continues at block 3070.

In some embodiments, kiosk 2000 deposits the change directly to a prepaid payment card, and does not need any customer information.

In other embodiments, kiosk 2000 collects customer information to generate a payment card tied to the customer, block 3070. In general, the customer information may be required by an issuer 1400 for the creation of an account associated with the payment card. In such embodiments, user interface 2800 may collect information such as the customer name, billing address, government issued identification number (such as social security number), or other personal identification information. Kiosk 2000 may provide this information to an issuer 1400 for the creation of a payment card account at the issuer 1400.

In some other embodiments, user interface 2800 may prompt customer to select an issuer 1400 for the payment card; the issuer may be selected from a predetermined list of issuers 1400, for example. In other embodiments, kiosk 2000 may assign the customer a payment card from a predetermined issuer 1400.

Once an issuer 1400 is selected, the issuer 1400 is contacted via payment network 1300. The issuer 1400 creates an account to be associated with the payment card, and provides kiosk with a unique Primary Account Number (PAN) for the new payment card.

Card printer 2500 prints the payment card with the unique Primary Account Number. In embodiments that tie the customer directly with the payment card, kiosk 2000 prints the customer's name on the payment card, block 3080. In other embodiments, the payment cards are pre-printed and provided to kiosk 2000.

At block 3090, using network interface 2300, kiosk 2000 contacts issuer 1400, via the payment network 1300, informing issuer of the amount deposited on to the payment card. Note that in some embodiments, a fee is charged for depositing the change on to a payment card, and consequently the entire change amount is not deposited on to the payment card. Furthermore, at block 3090 a customer receipt may be printed showing the amount deposited to an account associated with the payment card.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What is claimed is:

1. A payment kiosk method comprising:
    receiving from a user, via a cash/coin processing engine, a cash payment for a transaction that exceeds a purchase price of the transaction;
    prompting the user, via a user interface, on whether an amount of the cash payment exceeding the purchase price is to be returned to the user as change on a payment card;
    receiving, via the user interface, a first response from the user indicating that the change is to be returned to the user on a payment card;
    prompting the user, via the user interface, on whether the user has a payment card that can accept the change;
    receiving, via the user interface, a second response from the user indicating that the user does not have a payment card that can accept the change;
    receiving, from an issuer, a unique account number for a payment card after the cash payment is received;
    based on the first and second responses from the user, printing, via a card printer, the payment card with the unique account number;
    electronically depositing, via a network interface, at least a portion of the change into an account associated with the payment card based on the unique account number, the payment card being unactivated at the time of deposit; and
    activating the payment card with the issuer via the network interface, wherein the payment card is a substitute for the change.

2. The method of claim 1 wherein the payment card is a stored-value card, credit card, debit card, automatic teller machine (ATM) card, charge card, electronic wallet, Radio Frequency Identifier (RFID) device, cloud-based payment device, mobile phone, or Near Field Communication (NFC) enabled device.

3. The method of claim 1 further comprising:
    receiving customer information from the user via the user interface, including a customer name.

4. The method of claim 3 wherein activating the payment card includes providing the customer information to the issuer of the payment card.

5. The method of claim 3 further comprising:
    printing the customer name onto the payment card.

6. The method of claim 1 further comprising:
    prompting the user, via the user interface, for a choice to:
        receive the amount of the cash payment exceeding the purchase price as cash, or as the deposit to the account associated with the payment card.

7. A point of sale apparatus comprising:
    a cash/coin processing engine configured to receive a cash payment for a transaction that exceeds a purchase price of the transaction;
    a user interface configured to:
        prompt a user on whether an amount of the cash payment exceeding the purchase price is to be returned to the user as change on a payment card;
        receive a first response from the user indicating that the change is to be returned to the user on a payment card;
        prompt the user on whether the user has a payment card that can accept the change; and
        receive a second response from the user indicating that the user does not have a payment card that can accept the change;
    a card printer configured to print a payment card with a unique account number for the user in response to receiving the first and second responses from the user;
    a network interface configured to:
        receive, from an issuer, the unique account number for the payment card after the cash payment is received;
        electronically deposit at least a portion of the change into an account associated with the payment card based on the unique account number, the payment card being unactivated at the time of deposit; and
        activate the payment card, wherein the payment card is a substitute for the change.

8. The apparatus of claim 7 wherein the payment card is a stored-value card, credit card, debit card, automatic teller machine (ATM) card, charge card, electronic wallet, Radio Frequency Identifier (RFID) device, cloud-based payment device, mobile phone, or Near Field Communication (NFC) enabled device.

9. The apparatus of claim 7 wherein the user interface is configured to receive customer information from the user, including a customer name.

10. The apparatus of claim 9 wherein activating the payment card includes providing the customer information to the issuer of the payment card.

11. The apparatus of claim 9 wherein the card printer is configured to print the customer name onto the payment card at the point of sale apparatus.

12. The apparatus of claim 7 wherein the user interface is configured to prompt the user for a choice to: receive the amount of the cash payment exceeding the purchase price as cash, or as the deposit to the account associated with the payment card.

13. A non-transitory computer readable medium encoded with data and instructions, when executed by a computing device the instructions causing the computing device to:
   receive from a user, via a cash/coin processing engine, a cash payment for a transaction that exceeds a purchase price of the transaction;
   prompt the user, via a user interface, on whether an amount of the cash payment exceeding the purchase price is to be returned to the user as change on a payment card;
   receive, via the user interface, a first response from the user indicating that the change is to be returned to the user on a payment card;
   prompt the user, via the user interface, on whether the user has a payment card that can accept the change;
   receive, via the user interface, a second response from the user indicating that the user does not have a payment card that can accept the change;
   receive, from an issuer, a unique account number for a payment card after the cash payment is received;
   based on the first and second responses from the user, print, via a card printer, the payment card with the unique account number;
   electronically deposit, via a network interface, at least a portion of the change into an account associated with the payment card based on the unique account number, the payment card being unactivated at the time of deposit; and
   activate the payment card with the issuer via the network interface, wherein the payment card is a substitute for the change.

14. The computer readable medium of claim 13 wherein the payment card is a stored-value card, credit card, debit card, automatic teller machine (ATM) card, charge card, electronic wallet, Radio Frequency Identifier (RFID) device, cloud-based payment device, mobile phone, or Near Field Communication (NFC) enabled device.

15. The computer readable medium of claim 13, the instructions further causing the computing device to:
   receive customer information from the user via the user interface, including a customer name.

16. The computer readable medium of claim 15 wherein activating the payment card includes providing the customer information to the issuer of the payment card.

17. The computer readable medium of claim 15, the instructions further causing the computing device to:
   print the customer name onto the payment card with a card printer at the kiosk.

18. The computer readable medium of claim 1 the instructions further causing the computing device to:
   prompt the user, via the user interface, for a choice to: receive the amount of the cash payment exceeding the purchase price as cash, or as the deposit to the account associated with the payment card.

* * * * *